United States Patent
Vo et al.

(10) Patent No.: US 8,051,060 B1
(45) Date of Patent: Nov. 1, 2011

(54) AUTOMATIC DETECTION OF SEPARATORS FOR COMPRESSION

(75) Inventors: Kiem-Phong Vo, Berkeley Heights, NJ (US); Subhabrata Sen, New Providence, NJ (US)

(73) Assignee: AT&T Intellectual Property I, L.P.

( * ) Notice: Subject to any disclaimer, the term of this patent is extended or adjusted under 35 U.S.C. 154(b) by 299 days.

(21) Appl. No.: 12/378,336

(22) Filed: Feb. 13, 2009

(51) Int. Cl.
  *G06F 17/30* (2006.01)
(52) U.S. Cl. ........ 707/705; 707/755; 707/758; 707/763; 707/809
(58) Field of Classification Search .................. 707/755, 707/809, 999.101, 999.107, 705, 758, 763
See application file for complete search history.

(56) References Cited

U.S. PATENT DOCUMENTS

| | | | |
|---|---|---|---|
| 6,523,019 B1 * | 2/2003 | Borthwick | 706/45 |
| 6,850,950 B1 * | 2/2005 | Clarke et al. | 1/1 |
| 7,043,502 B1 * | 5/2006 | Green et al. | 1/1 |
| 7,756,873 B2 * | 7/2010 | Gould et al. | 707/737 |
| 7,849,075 B2 * | 12/2010 | Gould et al. | 707/714 |
| 2005/0114369 A1 * | 5/2005 | Gould et al. | 707/100 |
| 2005/0154692 A1 * | 7/2005 | Jacobsen et al. | 706/47 |
| 2006/0167592 A1 * | 7/2006 | Kudo et al. | 701/1 |

* cited by examiner

*Primary Examiner* — Thanh-Ha Dang
(74) *Attorney, Agent, or Firm* — Henry T. Brendzel

(57) ABSTRACT

A method that accepts a data file, iteratively tests different information units as record delimiters and field delimiters, and chooses as the data files record delimiter, R, and field delimiter, F, the information units that result in the lowest generalized entropy that is computed on fields created by use of the chosen delimiter pair R,F.

9 Claims, 2 Drawing Sheets

AUTOMATIC DETECTION OF SEPARATORS FOR COMPRESSION

BACKGROUND

This relates to data files and, more particularly, to large files.

At times one is faced with some large file whose structure is known only to the extent that it consists of records, that the records are separated by some (unknown) record delimiter, that each record comprises fields, and that the fields are separated by some (unknown) field delimiter. These files, which are often produced by databases and information processing systems, are called relational tables.

Modern information systems routinely generate and store massive relational tables. In the context of IP networks, for example, this includes a wealth of different types of collected data, including traffic (e.g., packet of low level traces), control (e.g., router forwarding tables, BGP and OSPF updates) and management (e.g., fault, SNMP traps) data. It is beneficial to process this type of data into forms that enhance data storage, access, and transmission. In particular, good compression can help to significantly reduce both storage and transmission costs.

Relational data files are typically presented in record-major order, meaning that data appears as a sequence of bytes in the order of records, each of which consists of fields ordered from left to right. On the other hand, in applications such as data compression, faster access of field data, and so on, it is beneficial to think of the data in field-major order. That is, to reorganize the data by first field, second field, etc.

To perform such a reorganization of data, it is required to know what information unit (e.g., character) constitutes the record delimiter, and what information unit constitutes the field delimiter. Unfortunately, in applications such as data compression and data structure discovery, one is often presented with a data file without any extra information. Thus, there is a need to develop techniques for identifying the record and field delimiters when a given data file is believed to be relational in nature.

Current techniques to detect delimiters are predominantly manual, requiring human scanning of the raw data for patterns, and combing the scanning with knowledge of what is typically used as delimiters. Such approaches are not effective for handling large volumes of data, so there is a pressing need for tools and techniques to automate the structure-extraction process.

SUMMARY OF THE INVENTION

An advance in the art is realized with a method that accepts a data file, iteratively tests different information units as record delimiters and field delimiters, and chooses as the data files record delimiter, R, and field delimiter, F, the information units that result in the lowest variability that is computed on fields created by use of the chosen delimiter pair R,F. In an illustrative embodiment, processing time is reduced by first identifying a subset of likely record delimiters, and restricting the search to that subset.

DETAILED DESCRIPTION

Figure 1:
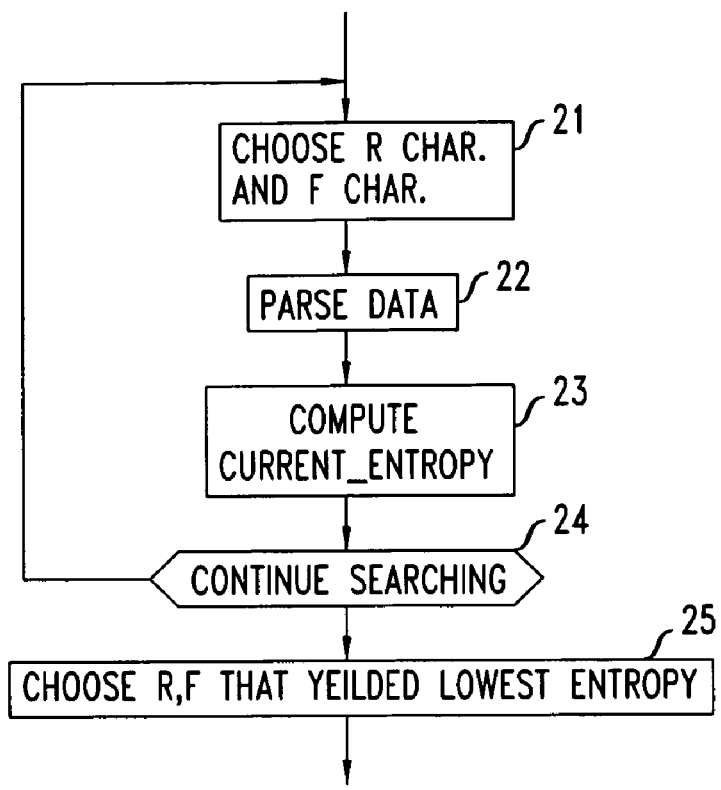
FIG. 1 presents a flow diagram of one embodiment of a method in accord with the principles of this invention.

An underlying assumption of this invention is that a presented data file is a relational table. Such a table typically contains some fields in which data are restricted and have low variability relative to all data or even to data in other fields. For example, take a relational data file with a field consisting of social security numbers among other fields containing other information such as job titles or home addresses. There is great variability when all data of a record are considered together. However, the social security field consists of precisely 9 digits. Likewise, even though a field of encrypted passwords may contain random characters with large variability, the length of an instance might not be fewer than some preordained number and typically not many more, and the alphabet would not include unprintable characters.

The following assumes the use of some function E(s) that can compute the variability of a collection of characters "s". Such a function may be customizable to a particular application when more information about it is available, but in the absence of any application-specific information, we default to using the Shannon entropy function (see "A Mathematical Theory of Communication" by C. E. Shannon, vol. 27, The Bell Systems Technical Journal, 1948).

An E(s) function to compute variability is called a "generalized entropy function" and the value that it computes for a data collection "s" is called the "generalized entropy" of "s". In the interest of succinctness, the following drops the term "generalized," leaving "entropy function" and "entropy".

Given a data file parsed to form records and fields within records using a pair of record and field delimiters (R,F), let the entropy of a field "j" be $E_j(R, F)$. Then, we define the field-wise entropy for this pair, E(R, F), as the sum taken over all fields; i.e., $$E(R, F) = \sum_j E_j(R, F).$$

Due to the considerations above, we realized that the field-wise entropy E(R, F) for a pair (R,F) that correctly parses the file should generally be smaller than that of a pair that incorrectly parses the file. This is the principle that we use to detect a good pair of record and field delimiters.

In the illustrative embodiments that utilize the principle disclosed above and which are presented below, it is assumed that the data file is a relational table, and that it has the following properties:

Each record terminates with a record delimiter;

Each record has a given number of fields;

When a relational table has records with variable numbers of fields, we assume that the maximum number of fields in all records is the correct number of fields, and treat a record with fewer fields as having an appropriate number of last virtual fields;

A field may have any number of characters, including no characters;

Each field in a record will be terminated by a field delimiter except for the last non-virtual one which is terminated by the record delimiter itself.

In accord with the principles disclosed herein any information unit can serve as a delimiter (such as an information unit that is more than one byte long), but typically the field delimiter and the record delimiter are a byte each (i.e., a single ASCII character), and that is assumed to be the case in the following illustrative embodiments.

FIG. 1 presents one realization in accord with the principles of this invention. At step 21a tentative characters pair R,F is chosen, and in step 22 the data is parsed using the chosen pair to result in a table with a plurality of columns, j. At step 23 an entropy measure, $E_j(R, F)$, is computed for each column j, followed by a sum over all of the columns, $$E^{current}(R, F) = \sum_j E_j(R, F).$$

to form a current field-wise entropy value. This value is stored, and control passes to step 24 where is it determined whether to continue searching. Typically, the process continues searching as long as there are R,F that have not been tested. In such a case control returns to step 21; otherwise, control passes to step 25 which chooses the characters pair R, F that yielded to lowest entropy.

Storage of the computed Current entropy values can be reduced by maintaining a low_water_mark entropy value (which initially starts at some arbitrary large value), and discarding any considered R,F character pairs with a Current entropy that is greater than the low_water_mark entropy value.

It is recognized that the number of iterations in the described FIG. 1 process is m×n, where m is the number of characters in the set of permissible R characters, and n is the number of characters in the set of permissible F characters. When the characters within the entire ASCII code are permissible, that corresponds to $2^{16}$ iterations, which is a significant number of iterations.

Figure 2:
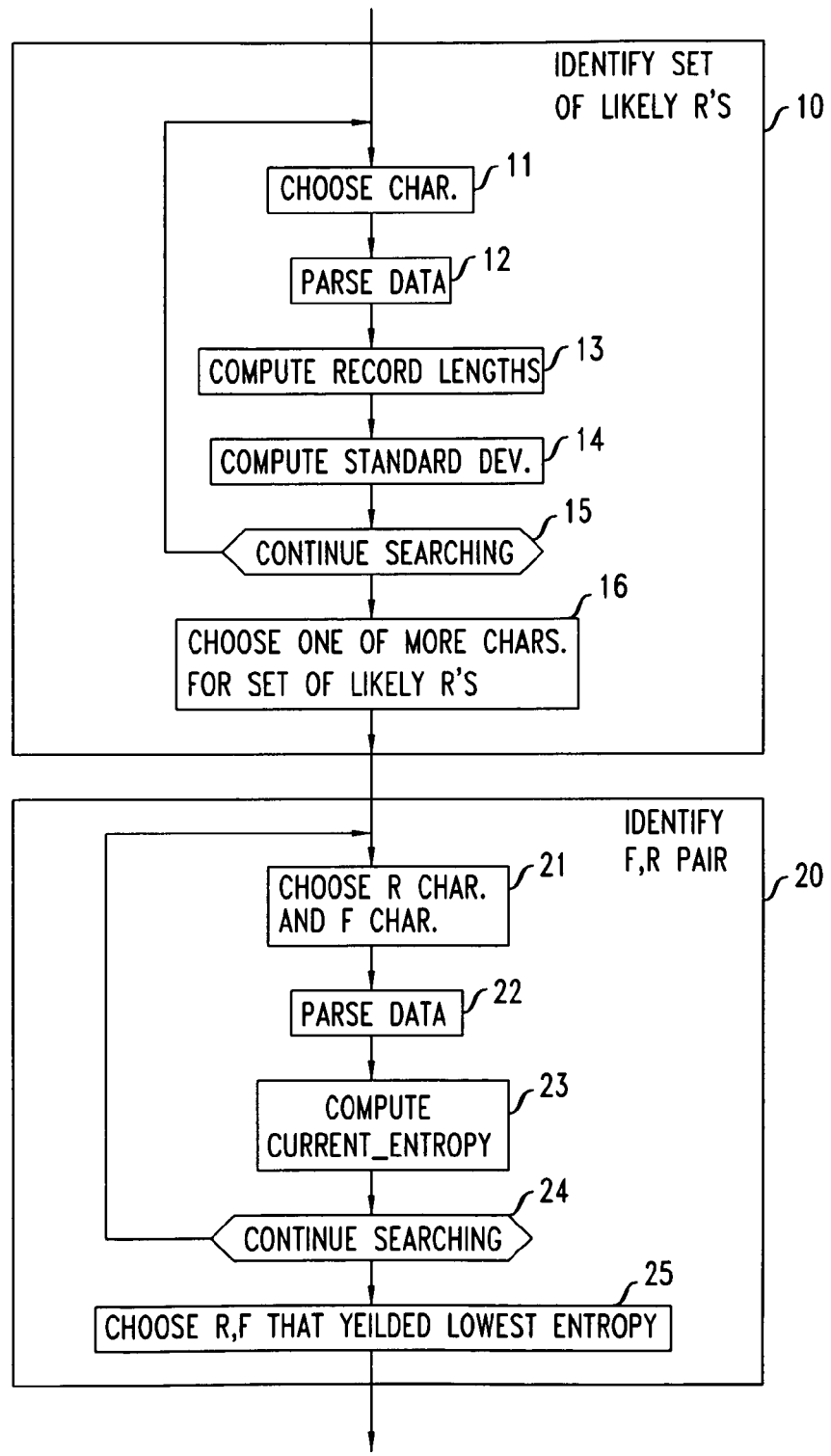
FIG. 2 presents a flow diagram of another embodiment of a method in accord with the principles of this invention.

Another realization, which is depicted in FIG. 2, reduces the number of iterations by choosing in a first phase (10) the record delimiter character, or a small set of likely record delimiter characters, followed by choosing in a second phase (20) a record delimiter from among the characters in the set as well as a field delimiter from a permissible set of field delimiters.

One approach that may be taken to identify a set of likely record delimiter characters is to employ knowledge of characters that are typically used for such purpose, knowledge of the application to which the data file under consideration belongs, informed guesses, or manual inspection of the data. Alternatively (or additionally) characters are identified that satisfy a chosen information theoretic criterion.

The process in FIG. 2 illustrates the latter, where the assumption is made that the table under investigation contains records that are approximately of equal length. This is a reasonable assumption with tables that have many fields, because such tables often have many fields for data that varies little if any in length (e.g. phone numbers, zip codes, employee ID numbers, passwords, social security numbers state names, city names, etc). Those fields reduce the effective variability of record lengths.

In step 11 a delimiter character R that has not been previously considered is chosen. In step 12 the data is parsed to create records, and in step 13 the lengths of the records are determined. In step 14 an overall standard deviation of the record lengths is computed, and stored. Control then passes to step 15 which returns control to step 11 unless all characters have been considered, in which case it passes control to step 16. Step 16 selects K characters that yielded the K-lowest standard deviation values as the candidate delimiters R. The value of K is a design choice, of course.

The number of iterations that are needed to obtain the K candidate characters R is $2^8$ if all characters of the 8-bit byte code are permissible.

Once the set of candidates for delimiters R is identified, the process enters the second phase where the each of the characters in the 8-bit byte code may be considered as delimiter F, and the entropy evaluated as disclosed above. This requires another $2^8$ iterations for each candidate record delimiter R. Thus, if the set of candidate record delimiters contains K elements, the total number of iterations is $(K+1)2^8$. This can be far smaller than $2^{16}$ iterations.

Still the FIG. 2 process as disclosed above requires the Current entropy value of equation 1 to be computed $2^8$ times, and equation 1 is computationally intensive, so it is advantageous to reduce the number of candidate delimiters F as well. Here, too, one may employ past knowledge, scanning the data, etc. and/or a process to identify a set of characters that satisfy a chosen criterion. For example, if it is assumed that at least 75% of the records have the same number of fields, say M, then every character that appears exactly M times in each record for 75% would be a good candidate field delimiter. Those candidate field delimiters are found by simply first creating a histogram of the number of occurrences of each character in each record, followed by a histogram of the histograms (across the records), and application of a threshold.

This approach can also be used to reduce the set of candidate R delimiters. For example, if when employing when R="?" the character "z" appears precisely 3 times in only 77% of the records, with R="\n" the character "|" appears 13 times in 98% of the records, and with R="0" no character appears in the records exactly M times (regardless of the value of M) in more than 50% of the times, then one may reasonably conclude that the character "0" is a poor candidate for delimiter R, and that character "\n" is a candidate that is more likely than the candidate "?" to be the correct delimiter.

As indicated above, the entropy value $E_j$ of equation (1) is basically a measure of variability of the data in column j. There are numerous methods for computing such entropy, and the precise method employed is a design choice. Again, one simple approach is to measure the variability of the column's string length.

The invention claimed is:

1. A method executed by a processor, on a data file having records, where each record is delimited by a record delimiter information unit, R, and each record has a plurality of fields that are delimited by a field delimiter information unit, F, and where said information units R and F are not known, for identifying said information unit R and said information unit F, where R and F are taken from a set of permissible delimiters, comprising the steps of:

choosing a pair of candidate information units, R,F;

parsing said data file based on said candidate information units, R,F, to result in records, wherein each of the records has a number of fields;

computing a field-wise generalized entropy of said data file;

operating on said field-wise generalized entropy value;

returning to said step of choosing, if a pair of information units, R,F, exists in said set of permissible delimiters that has not been considered as candidate information units, R,F; and choosing the information unit pair R,F, as delimiters R and F, respectively, that yielded smallest of said field-wise generalized entropy value, to transform said data file into a file of cognizable records.

2. The method of claim 1 where said step of computing comprises the steps of:
   computing a generalized entropy value for data in each of said fields;
   combining the computed generalized entropy values to form said field-wise generalized entropy value.

3. The method of claim 2 where:
   said step of operating comprises storing each of said field-wise generalized entropy values in association with the currently chosen pair of candidate information unit pair R,F; and
   said choosing comprises identifying from among the stored overall generalized entropy values the smallest overall value.

4. The method of claim 3 where said step of operating comprises:
   comparing said overall generalized entropy value to a stored low_water_mark value; and
   replacing said low_water_mark value with said overall value when said overall entropy value is lower than said stored low_water_mark value.

5. The method of claim 3 further comprising a process of identifying said set of permissible delimiters.

6. The method of claim 5 where said set of permissible delimiters comprises a subset of permissible delimiters R and a subset of permissible delimiters F, and said process comprises a step of choosing information units for the subset of permissible delimiters R based on either one, or both, of:
   (1) one or more of: knowledge of information units that typically serve as delimiters R, specific information known about said data file, scanning the data in said data file; and
   (2) processing of said data file.

7. The method of claim 6 where said processing employs a chosen criterion.

8. The method of claim 5 where delimiters chosen for said subset of delimiters F are chosen based processing of said data file.

9. The method of claim 8 where delimiters chosen for said subset of delimiters F are chosen based processing of said data file and on information units chosen for said subset of delimiters R.

* * * * *